April 16, 1935.　　　　J. A. SCHEUTZ　　　　1,997,752
AUTOMATIC EXPANSION BUMPER
Filed Dec. 9, 1932
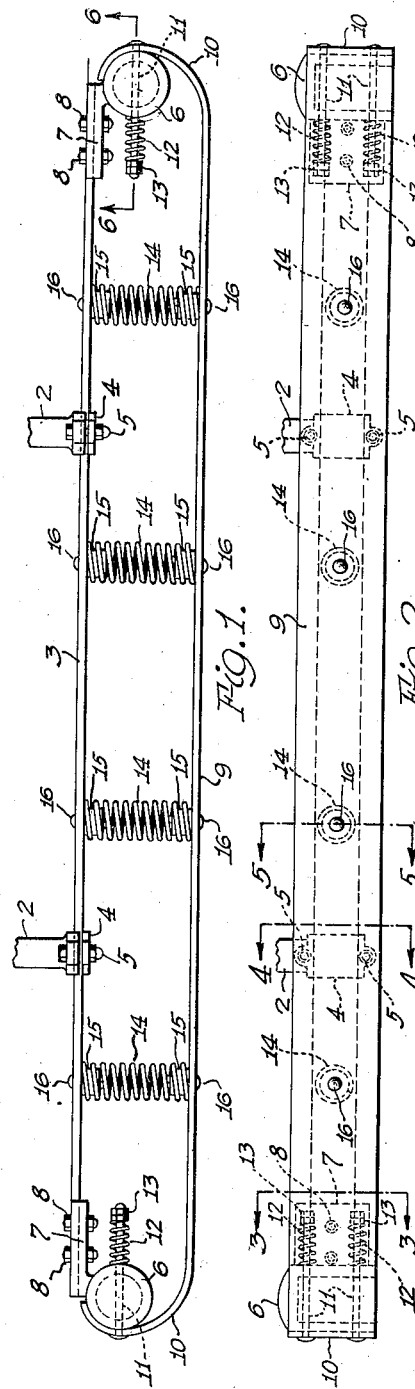
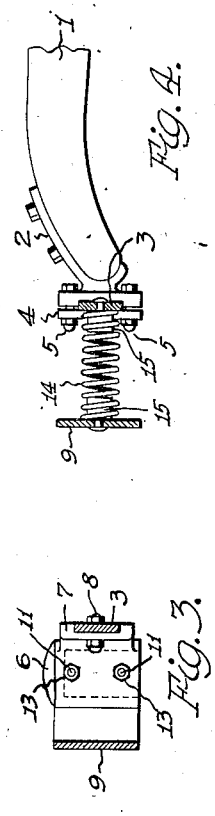
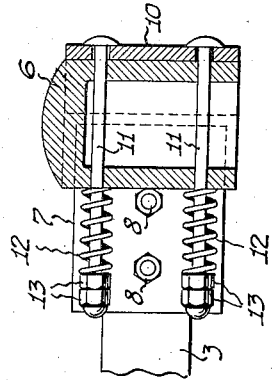
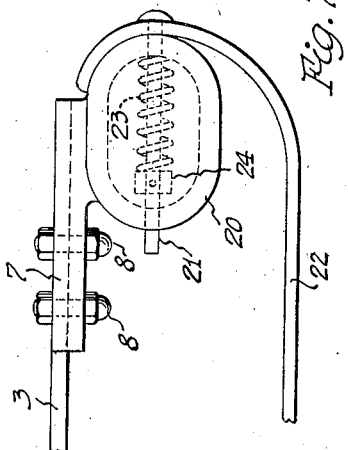
INVENTOR
Joseph A. Scheutz,
BY
ATTORNEYS Patented Apr. 16, 1935

1,997,752

UNITED STATES PATENT OFFICE 1,997,752

AUTOMATIC EXPANSION BUMPER

Joseph A. Scheutz, Hazel Park, Mich., assignor of one-half to Adolph G. Boerner, Detroit, Mich.

Application December 9, 1932, Serial No. 646,396

9 Claims. (Cl. 293—55)

The present invention pertains to a novel bumper for motor vehicles and the like, and the principal object is to provide such a bumper which absorbs the shock or impact and prevents it from passing to and injuring the chassis frame.

This object is accomplished essentially by mounting the bumper bar in such a manner that its inherent resiliency is utilized in cushioning the impact. Further, the mounting of the bumper bar is such that it is returned automatically to its normal condition after the force of the impact has been relieved. The construction in this respect consists in bending the ends of the resilient bumper bar around a pair of so-called expansion heads suitably carried by the vehicle and supporting the bar by means of bolts or rods extending from these ends slidably through the heads. When the bumper bar takes a shock or impact, it tends to flatten out at the bent ends, and these ends therefore tend to withdraw outwardly from the heads, such action being permitted by the slidable mounting of the ends with respect to the heads. The slidable bolts or rods also carry springs which are compressed on the outward movement of the ends. These springs further assist in absorbing the shock and also serve to return the bent ends to their normal position against the heads when the force of the impact has been relieved.

Another characteristic of the invention is the provision of coil springs between the bumper bar and another transverse bar disposed inwardly thereof and preferably fixed to the ends of the chassis frame. These springs also assist in taking the impact and prevent excessive bending of the bumper bar. The inner bar preferably carries the expansion heads on which the ends of the resilient bumper bar are slidably mounted.

The invention is fully disclosed by way of example in the following description and in the accompanying drawing, in which—

Figure 1 is a plan view of the bumper installed on the end of a motor vehicle;

Fig. 2 is an elevation thereof;

Figs. 3, 4 and 5 are sections on the lines 3—3, 4—4 and 5—5 respectively of Figure 2;

Fig. 6 is a section on the line 6—6 of Figure 1; and

Fig. 7 is a detail plan view of a modified end construction.

Reference to these views will now be made by use of like characters which are employed to designate corresponding parts throughout.

The ends of the chassis to which the bumper is to be attached are indicated by the numeral 1, and these ends carry clamping brackets 2 for the attachment of the bumper assembly in the manner presently to be described. A back bumper bar 3 of substantial rigidity is laid across the ends of the chassis at either or both ends of the vehicle and is conveniently seated in the brackets 2 as shown more clearly in Figure 4. The outer face of the bar 3 is engaged by clamping plates 4 which are firmly secured to the bracket 2 by bolts 5, thereby holding the bar 3 securely in position.

To the ends of the bar are secured clamping heads 6 which are preferably made in the form of hollow cylindrical castings or forgings standing on a vertical axis. Each such member carries an integral bracket 7 for attachment to an end of the bar 3 by means of bolts 8 shown in Figures 1 and 6.

The bumper bar proper or striking bar is indicated by the numeral 9 and lies parallel to the back bar 3 in spaced relation thereto. This bar lies forward of the bar 3 in the front end assembly and rearward of the bar 3 in the rear end assembly and is the member which first receives the impact in bumping or in a collision. It is made of a suitable spring steel, and its ends are bowed or arched at 10 into surface contact with the heads 6 at the outer sides of the latter, so that the bowed ends are disposed outwardly of the heads. The support for the bar 9 is made at the heads and it consists principally of bolts 11 secured to the ends and passed slidably through the heads. Each bolt is surrounded by a spring 12 having one end bearing against locknuts 13 on the bolt and its other end bearing outwardly against the head. Thus, the ends 10 with the bolts 11 may be drawn outwardly from the heads and thereby compressing the springs 12, in a manner which will presently be described.

Further, a series of coil springs 14 lying parallel to the axis of the chassis are inserted between each bar 3 and the corresponding bumper bar 9. The ends of these springs are seated on studs 15 secured respectively to these bars by bolts 16.

In the operation of the device, an impact on the bumper bar 9 is first cushioned by the intermediate coil springs 14. If the impact is sufficient to compress these springs considerably, the bar 9 tends to flatten out at the bent ends 10. These ends therefore move outwardly from the adjacent heads 6, and this action is possible by reason of the slidable mounting of the bolts 11 as previously described. In this action, the springs 12 are compressed, and when the impact is relieved, all the springs expand and return the bar 9 to its original or normal condition. Thus, the impact is absorbed, not only by the springs but by the inherent resiliency of the bumper bar 9, and the impact is thereby prevented from reaching and damaging the chassis frame.

Figure 7 shows a somewhat modified construction of expansion head. The head 20 is hollow and oval and slidably supports the bolt 21 extending from the end 22 of the bumper as previously described. The retaining spring 23, surrounding the bolt 21, however, is concealed within the head 20. One end thereof bears against a nut 24 fixed on the bolt 21, and the other end bears outwardly against the head so that the action is the same as in the previously described construction.

Although specific embodiments of the invention have been illustrated and described, it will be understood that various alterations in the details of construction may be made without departing from the scope of the invention, as indicated by the appended claims.

What I claim is:

1. A bumper comprising a pair of fixed heads having curved outer sides, a bumper bar having its ends curved laterally to engage said curved sides of said heads and confine said heads between said ends, means extending from said ends in a direction generally parallel to said bar, whereby to permit outward movement of said ends away from said heads, and springs carried by said means to yieldingly resist outward movement of said ends away from said heads.

2. A bumper comprising a pair of fixed heads, a bumper bar having its ends arched around said heads to confine the heads between said ends, bolts extending from said ends slidably through said heads in a direction generally parallel to said bar, whereby to permit outward movement of said ends relatively to said heads.

3. A bumper comprising a pair of fixed heads, a bumper bar having its ends arched around said heads to confine the heads between said ends, bolts extending from said ends slidably through said heads in a direction generally parallel to said bar, whereby to permit outward movement of said ends relatively to said heads, and springs carried by said bolts and bearing outwardly against said heads to resist outward movement of said ends.

4. A bumper comprising a pair of fixed heads, a bumper bar having its ends arched around said heads to confine the heads between said ends, means extending from said ends slidably through said heads in a direction generally parallel to said bar, whereby to permit outward movement of said ends relatively to said heads, a back bar adapted for attachment to a chassis frame and spaced from the bumper bar in the direction toward such frame, and springs inserted between said bars.

5. A bumper comprising a pair of fixed heads, a bumper bar having its ends arched around said heads to confine the heads between said ends, means extending from said ends slidably through said heads in a direction generally parallel to said bar, whereby to permit outward movement of said ends relatively to said heads, a back bar adapted for attachment to a chassis frame and spaced from the bumper bar in the direction toward such frame, said heads being carried by said bar, and springs inserted between said bars.

6. A bumper comprising a pair of fixed heads, a bumper bar having its ends arched around said heads to confine the heads between said ends, means extending from said ends slidably through said heads in a direction generally parallel to said bar, whereby to permit outward movement of said ends relatively to said heads, and springs carried by said means and bearing outwardly against said heads to resist outward movement of said ends, said springs being enclosed within said heads.

7. A bumper comprising a pair of fixed heads, a bumper bar having its ends arched around said heads to confine the heads between said ends, bolts extending from said ends slidably through said heads in a direction generally parallel to said bar, whereby to permit outward movement of said ends relatively to said heads, and springs carried by said bolts and bearing outwardly against said heads to resist outward movement of said ends, said springs being enclosed within said heads.

8. A bumper comprising a pair of fixed members, a bumper bar having its ends extended laterally to engage the outer sides of said members and prevent bodily endwise movement of said bar, and yieldable means extending longitudinally of said bar to normally hold said ends in contact with said members and permit movement of said ends upon impact against said bar.

9. A bumper comprising a pair of fixed members, a yieldable bumper bar having its ends formed to embrace said members and normally in contact with the outer sides thereof to prevent bodily endwise movement of said bar, and means exerting a force longitudinally of said bar to yieldingly hold the same with said formed ends in contact with said members and to prevent outward movement of said ends away from said members under impact against said bar.

JOSEPH A. SCHEUTZ.